(12) United States Patent
Fini et al.

(10) Patent No.: US 12,415,925 B2
(45) Date of Patent: Sep. 16, 2025

(54) SULFUR-MODIFIED BITUMEN COMPOSITIONS

(71) Applicants: Elham Fini, Phoenix, AZ (US); Albert Hung, Tempe, AZ (US)

(72) Inventors: Elham Fini, Phoenix, AZ (US); Albert Hung, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 780 days.

(21) Appl. No.: 17/565,589

(22) Filed: Dec. 30, 2021

(65) Prior Publication Data

US 2022/0204773 A1    Jun. 30, 2022

Related U.S. Application Data

(60) Provisional application No. 63/132,402, filed on Dec. 30, 2020.

(51) Int. Cl.
*C08L 95/00* (2006.01)

(52) U.S. Cl.
CPC ........... *C08L 95/00* (2013.01); *C08L 2555/54* (2013.01); *C08L 2555/64* (2013.01)

(58) Field of Classification Search
CPC ... C08L 95/00; C08L 2555/54; C08L 2555/64
See application file for complete search history.

(56) References Cited

U.S. PATENT DOCUMENTS

| | | | | |
|---|---|---|---|---|
| 2,182,837 A | * | 12/1939 | Bacon | C10C 3/023 404/79 |
| 2,686,166 A | * | 8/1954 | Norman | C08L 95/00 524/925 |
| 3,803,066 A | | 4/1974 | Petrossi | |
| 4,145,322 A | | 3/1979 | Maldonado et al. | |
| 4,567,222 A | | 1/1986 | Hagenbach et al. | |
| 6,737,478 B2 | | 5/2004 | Obrecht et al. | |
| 2011/0294927 A1 | * | 12/2011 | Williams | C08L 95/00 524/570 |
| 2015/0361318 A1 | * | 12/2015 | Crews | C08L 25/04 524/68 |
| 2017/0247542 A1 | * | 8/2017 | Williams | E01C 7/187 |

FOREIGN PATENT DOCUMENTS

| | | | |
|---|---|---|---|
| GB | 1507332 | * | 3/1974 |
| WO | WO 2012/061579 A1 | | 5/2012 |

OTHER PUBLICATIONS

Simone Alves Da Silva, "Polycyclic aromatic hydrocarbons content and fatty acids profile in coconut, safflower, evening primrose, and linseed oils," 2018, Food Chemistry (Elsevier), 798-805. (Year: 2018).*

Gedik, "Analytical, Morphological, and Rheological Behavior or Sulphur-Extended-Binder," 2016, Can. J. Civ. Eng. , 43, pp. 532-541. (Year: 2016).*

Airey, Gordon Dan. "State of the art report on ageing test methods for bituminous pavement materials." International Journal of Pavement Engineering 4.3 (2003): 165-176.

ASTM-D7175-15., "Standard Test Method for Determining the Rheological Properties of Asphalt Binder Using a Dynamic Shear Rheometer," ASTM International, West Conshohocken, PA, 2015, 16 pages.

Bukowski, J., et al. "An alternative asphalt binder, sulfur-extended asphalt (SEA)." No. FHWA-HIF-12-037. United States. Federal Highway Administration, 2012, pp. 1-13.

Carrin et al., "Peanut oil: Compositional data," Review Article European Journal of Lipid Science and Technology, Jul. 2010, 112(7):697-707.

Chung et al., The use of elemental sulfur as an alternative feedstock for polymeric materials. Nature Chemistry, 2013, 5 (6), 518-524.

Delley, An all-electron numerical method for solving the local density functional for polyatomic molecules. Journal of Chemical Physics, 1990, 92 (1), 508-517.

Delley, B., "From molecules to solids with the DMol3 approach," J. Chem. Phys., 2000, 113, 7756-7764.

Dhasmana et al. "Rheological and Chemical Characterization of Biobinders from Different Biomass Resources" Transporation Research Board, Jan. 2015, 2505(1):121-129.

Fairbrother et al., The polymerization of sulfur. Journal of Polymer Science 1955, 16 (82), 459-469.

Fini, Elham H., et al. "Active mineral fillers arrest migrations of alkane acids to the interface of bitumen and siliceous surfaces." ACS Sustainable Chemistry & Engineering 7.12 (2019): 10340-10348.

Fini, Elham H., et al. "Chemical characterization of biobinder from swine manure: Sustainable modifier for asphalt binder." Journal of Materials in Civil Engineering 23.11 (2011): 1506-1513.

Foreman, J., and R. L. Blaine. "Isothermal crystallization made easy: a simple model and modest cooling rates." ANTEC'95. 2 (1995): 2409-2412.

Gawel, Irena. "Sulphur-modified asphalts." Developments in petroleum science. vol. 40. Elsevier, 2000. 515-535.

Grimme, Density functional theory with London dispersion corrections. Wiley Interdisciplinary Reviews: Computational Molecular Science 2011;1(2):211-28.

(Continued)

*Primary Examiner* — Robert S Jones, Jr.
*Assistant Examiner* — Joshua Caleb Bledsoe
(74) *Attorney, Agent, or Firm* — Fish & Richardson P.C.

(57) ABSTRACT

Preparing a modified bitumen composition includes combining bitumen with elemental sulfur to yield a mixture, and crystallizing the elemental sulfur on a surface of the bitumen to yield a layer of elemental sulfur on the surface of the bitumen. The mixture typically includes about 5 wt % to about 15 wt % of the elemental sulfur. A modified bitumen composition includes A modified bitumen composition includes bitumen and elemental sulfur on a surface of the bitumen. The modified bitumen composition includes about 5 wt % to about 15 wt % of the elemental sulfur.

19 Claims, 1 Drawing Sheet

(56) References Cited

OTHER PUBLICATIONS

Hosseinnezhad et al., "Resistance mechanisms of biomodified binders against ultraviolet exposure," ACS Sustainable Chemistry & Engineering, Feb. 5, 2020, 8(6):2390-2398.

Hosseinnezhad et al., Multiscale Evaluation of Moisture Susceptibility of Biomodified Bitumen. ACS Applied Bio Materials (2019) 2, 5779-5789.

Hosseinnezhad, S., et al. "Physiochemical characterization of synthetic bio-oils produced from bio-mass: a sustainable source for construction bio-adhesives." RSC advances 5.92 (2015): 75519-75527.

Hosseinnezhad, Shahrzad, et al. "Differential effects of ultraviolet radiation and oxidative aging on bio-modified binders." Fuel 251 (2019): 45-56.

Hung et al., "Preventing Assembly and Crystallization of Alkane Acids at the Silica-Bitumen Interface To Enhance Interfacial Resistance to Moisture Damage," Industrial & Engineering Chemistry Research, vol. 58, No. 47, pp. 21542-21552, 2019.

Hung, Albert M., and Elham H. Fini. "AFM study of asphalt binder "bee" structures: Origin, mechanical fracture, topological evolution, and experimental artifacts." Rsc Advances 5.117 (2015): 96972-96982.

Hung, Albert M., et al. "Absorption spectroscopy to determine the extent and mechanisms of aging in bitumen and asphaltenes." Fuel 242 (2019): 408-415.

Hung, Albert M., et al. "Effects of water exposure on bitumen surface microstructure." Construction and Building Materials 135 (2017): 682-688.

Hung, Albert M., et al. "Evolution of morphological and nanomechanical properties of bitumen thin films as a result of compositional changes due to ultraviolet radiation." ACS sustainable chemistry & engineering 7.21 (2019): 18005-18014.

Hung, Albert M., et al. "Intermolecular interactions of isolated bio-oil compounds and their effect on bitumen interfaces." ACS Sustainable Chemistry & Engineering 5.9 (2017): 7920-7931.

Hung, Albert, and Elham H. Fini. "Surface morphology and chemical mapping of UV-aged thin films of bitumen." ACS Sustainable Chemistry & Engineering 8.31 (2020): 11764-11771.

Karnati, S. R.; Oldham, D.; Fini, E. H.; Zhang, L., Surface functionalization of silica nanoparticles with swine manure-derived bio-binder to enhance bitumen performance in road pavement. Construction and Building Materials 2021, 266, 121000, 8 pages, DOI: https://doi.org/10.1016/j.conbuildmat.2020.121000.

Khare, Peeyush, et al. "Asphalt-related emissions are a major missing nontraditional source of secondary organic aerosol precursors." Science advances 6.36 (2020): eabb9785, pp. 1-14.

Kim, Yong-Rak, et al. "Experimental evaluation of anti-stripping additives in bituminous mixtures through multiple scale laboratory test results." Construction and Building Materials 29 (2012): 386-393.

Li, Xiangyu, et al. "Full daytime sub-ambient radiative cooling in commercial-like paints with high figure of merit." Cell Reports Physical Science 1.10 (2020).

Liu, Gang, et al. "α-Sulfur crystals as a visible-light-active photocatalyst." Journal of the American Chemical Society 134.22 (2012): 9070-9073.

Makowska et al., The oxidation of bitumen witnessed in-situ by infrared spectroscopy. Materials and structures 2017;50(3):189.

Mousavi, M.; Oldham, D.; Fini, E. H. Using fundamental material properties to predict the moisture susceptibility of the asphalt binder: polarizability and a moisture-induced shear-thinning index. ACS Applied Bio Materials, 2020, 3 (11), 7399-7407. DOI: https://doi.org/10.1021/acsabm.0c00374.

Mousavi, M.; Pahlavan, F.; Oldham, D.; Hosseinnezhad, S.; Fini, E. H. Multiscale Investigation of Oxidative Aging in Biomodified Asphalt Binder. J. Phys. Chem. C 2016, 120, 17224-17233.

O'Hara F, Blackmond DG, Baran PS. Radical-based regioselective C—H functionalization of electron deficient heteroarenes: scope, tunability, and predictability. Journal of the American Chemical Society 2013; 135(32):12122-34.

Oldham, Daniel, et al. "Investigating bitumen rejuvenation mechanisms using a coupled rheometry-morphology characterization approach." Construction and Building Materials 159 (2018): 37-45.

Pahlavan, F.; Hung, A. M.; Zadshir, M.; Hosseinnezhad, S.; Fini, E. H. Alteration of π-Electron Distribution To Induce Deagglomeration in Oxidized Polar Aromatics and Asphaltenes in an Aged Asphalt Binder. ACS Sustainable Chemistry & Engineering 2018, 6, 6554-6569. 10.1021/acssuschemeng.8b00364.

Pahlavan, F.; Hung, A.; Fini, E. H., "Evolution of molecular packing and rheology in asphalt binder during rejuvenation," Fuel 2018, 222, 457-464.

Pahlavan, F.; Mousavi, M.; Hung, A. M.; Fini, E. H., "Characterization of oxidized asphaltenes and the restorative effect of a bio-modifier," Fuel 2018, 212, 593-604.

Pahlavan, Farideh, et al. "Investigating molecular interactions and surface morphology of wax-doped asphaltenes." Physical Chemistry Chemical Physics 18.13 (2016): 8840-8854.

Pasandín, A. R., and I. Pérez. "The influence of the mineral filler on the adhesion between aggregates and bitumen." International Journal of Adhesion and Adhesives 58 (2015): 53-58.

Perdew, J. P.; Burke, K.; Ernzerhof, M., "Generalized gradient approximation made simple," Phys. Rev. Lett., Oct. 28, 1996, 77(18):3865-3868.

Petersen, J. C., "A Review of the Fundamentals of Asphalt Oxidation: Chemical, Physicochemical, Physical Property, and Durability Relationships," Transportation Research Circular; Transportation Research Board, Oct. 2009; (E-C140), 78 pages.

Petrossi et al., Reactions and technological properties of sulfur-treated asphalt. Industrial & Engineering Chemistry Product Research and Development 11, 214-219 (1972).

Sakib et al., A review of the evolution of technologies to use sulphur as a pavement construction material. International Journal of Pavement Engineering, (2021) 22(3):392-403.

Shen, Weiguo, et al. "Preparation of titanium dioxide nano particle modified photocatalytic self-cleaning concrete." Journal of cleaner production 87 (2015): 762-765.

Smith et al., (2018). High sulfur content polymers: the effect of crosslinker structure on inverse vulcanization. Journal of Polymer Science Part A: Polymer Chemistry, 56(16), 1777-1781.

Steudel et al., Thermal Polymerization and Depolymerization Reactions of 10 Sulfur Allotropes Studied by HPLC and DSC [1]. Zeitschrift für anorganische und allgemeine Chemie 1984, 517 (10), 7-42.

Timm et al., Evaluation of Mixture Performance and Structural Capacity of Pavements Utilizing Shell Thiopave®: Phase II: Construction, Laboratory Evaluation and Full-Scale Testing of Thiopave® Test Sections—Final Report. NCAT Report 12-07 (2012) 77 pages.

U.S. Department of the Interior U.S. Geological Survey, Mineral Commodity Summaries 2020, 204 pages.

Wu et al., Catalytic inverse vulcanization. Nature Communications 2019, 10 (1), 647, 9 pages.

Yan, Peiyao, et al. "Inverse vulcanized polymers with shape memory, enhanced mechanical properties, and vitrimer behavior." Angewandte Chemie International Edition 59.32 (2020): 13371-13378.

Yu, J.-Y.; Feng, P.-C.; Zhang, H.-L.; Wu, S.-P. Effect of Organo-Montmorillonite on Aging Properties of Asphalt. Construct. Build. Mater. 2009, 23, 2636-2640.

Zadshir, Mehdi, et al. "Application of a biomodifier as fog sealants to delay ultraviolet aging of bituminous materials." Journal of Materials in Civil Engineering 30.12 (2018): 04018310.

Zeng, Wenbo, et al. "Research on Ultra Violet (UV) aging depth of asphalts." Construction and Building Materials 160 (2018): 620-627.

Zhang et al., Inverse vulcanization of elemental sulfur and styrene for polymeric cathodes in Li—S batteries. Journal of Polymer Science Part A: Polymer Chemistry 55, 107-116 (2017).

Zhang et al., Nucleophilic activation of elemental sulfur for inverse vulcanization and dynamic covalent polymerizations. Journal of Polymer Science Part A: Polymer Chemistry 2019, 57 (1), 7-12.

(56) References Cited

OTHER PUBLICATIONS

Zhang et al., "Recent advances in the polymerization of elemental sulphur, inverse vulcanization and methods to obtain functional Chalcogenide Hybrid Inorganic/Organic Polymers (CHIPS)," Polymer Chemistry, 2019, 10(30):4078-4105.

* cited by examiner

SULFUR-MODIFIED BITUMEN COMPOSITIONS

CROSS-REFERENCE TO RELATED APPLICATION

This application claims the benefit of U.S. Patent Application No. 63/132,402 entitled "SULFUR-MODIFIED BITUMEN COMPOSITIONS" and filed on Dec. 30, 2020, which is incorporated herein by reference in its entirety.

This invention was made with government support under 1928795 and 1935723 awarded by the National Science Foundation. The government has certain rights in the invention.

TECHNICAL FIELD

This invention relates to sulfur-modified bitumen compositions.

BACKGROUND

The U.S. produces millions of metric tons of elemental sulfur annually, mostly from industrial processes, particularly oil and gas refining, where sulfur is an undesirable waste product. Due to the recent reduction in allowable sulfur in marine fuel as well as the development of sulfur-rich oil reserves such as the Athabasca oil sands, there is significant interest in finding commercially viable applications that use the increasing supply of elemental sulfur available on the market. At one end of sulfur utilization, inverse vulcanization chemistry can produce sulfur-polymer materials directly from waste sulfur. However, widespread adoption and scale-up of such materials has yet to be realized because their mechanical properties can be limited and concerns remain regarding degradation byproducts and related material end-of-life issues.

SUMMARY

This disclosure describes sulfur-modified bitumen compositions, including compositions prepared by combining elemental sulfur and petroleum bitumen for use in waterproof sealants and binders to glue together stone aggregate in composites such as asphalt pavement and roof shingles. The added sulfur can promote in-situ polymerization with the bitumen matrix, thereby obviating the need for polymer additives. The impact of elemental sulfur on surface properties, oxidation, and diffusion in bitumen is described, including sulfur crystallization out of bitumen mixtures. Properties of sulfur as a modifier of bitumen, including morphology, superhydrophobic character, mechanical and self-healing properties, and photocatalytic ability are described. In some cases, the sulfur serves as a photoactive shield to protect asphalt underlayers against solar radiation. Methods and compositions for enabling, controlling, promoting, and suppressing sulfur crystallization at the surface or in the bulk mixture for improved material performance are also described.

In one example, sulfur blooms occur on a bitumen surface in millimeter-sized patches of microscale crystals. The blooms are regenerative and increase in prevalence as bitumen goes through an oxidative aging process. Contact-angle measurements show that the bloom imparts roughness-enhanced hydrophobicity to the bitumen surface. The hydrophobicity of sulfur crystals was investigated using density functional theory (DFT). It was found that sulfur repels water molecules: the water molecules were unable to make strong H-bonds with sulfur due to the lower electronegativity of sulfur atoms compared to oxygen atoms. It was also found that sulfur has good interactions with polyaromatics such as those found in bitumen, which in turn deters sulfur crystallization. Reduced crystallization allows sulfur to migrate to the surface of bitumen and generate sulfur blooms. Due to the hydrophobic properties of the sulfur blooms, the latter phenomenon can lead to a self-cleaning surface layer, which is continuously self-regenerated while the sulfur supply lasts in the bulk bitumen, based at least in part on the extent of crystallization of the sulfur. Thus, the sustainability of bituminous composites can be promoted while increasing their durability and valorizing waste sulfur.

In a first general aspect, preparing a modified bitumen composition includes combining bitumen with elemental sulfur to yield a mixture, such that the mixture includes about 5 wt % to about 15 wt % of the elemental sulfur, and crystallizing the elemental sulfur on a surface of the bitumen to yield a layer of elemental sulfur on the surface of the bitumen.

Implementations of the first general aspect can include one or more of the following features.

Some implementations include preparing the mixture including about 10 wt % of the elemental sulfur. In some cases, crystallizing the elemental sulfur on the surface of the bitumen includes heating the bitumen. Crystallizing the elemental sulfur on the surface of the bitumen can include heating the bitumen under pressure. Some implementations further include combining a bio-oil with the mixture. The bio-oil can include one or more of waste vegetable oil, wood pellet oil, corn stover oil, and miscanthus oil. In some cases the bio-oil incudes polyaromatic molecules.

In a second general aspect, a modified bitumen composition includes a mixture of bitumen and elemental sulfur, such that the modified bitumen composition includes about 5 wt % to about 15 wt % of the elemental sulfur, and at least some of the elemental sulfur is on a surface of the modified bitumen.

Implementations of the second general aspect can include one or more of the following features.

In some implementations, the elemental sulfur is in crystalline form. The modified bitumen composition can include about 10 wt % of the elemental sulfur. In some cases, the elemental sulfur on the surface of the modified bitumen is in a discontinuous layer on the surface of the modified bitumen. The discontinuous layer can include a multiplicity of sulfur blooms. In some cases, the composition further includes a bio-oil. The modified bitumen can include about 5 wt % to about 15 wt % of the bio-oil. In some implementations, the bio-oil includes one or more of waste vegetable oil, wood pellet oil, corn stover oil, and miscanthus oil. The bio-oil can include polyaromatic molecules.

In some implementations, at least some of the elemental sulfur is amorphous, and at least some of the amorphous elemental sulfur is beneath a surface of the modified bitumen.

In a third general aspect, a building material includes the modified bitumen composition of the second general aspect. In some cases, the building material is configured to yield self-regenerating sulfur blooms on a surface of the building material. The building material can include a pavement material or a roofing material.

Bitumen materials such as those used on roofs and roads can be a source of potentially harmful volatile organic compounds (VOC) and secondary organic aerosols (SOA). A layer of solid sulfur crystals (a sulfur "bloom") on the bitumen surface can serve as a physical barrier to VOC evaporation. Moreover, crystalline sulfur can generate reactive radicals upon exposure to sunlight. These free radicals generated by the sulfur bloom can also photocatalytically decompose VOC before they evaporate and thereby eliminate a source of air pollution from bituminous materials in the built environment. The sulfur bloom can impart roughness-enhanced hydrophobicity, thereby serving as a physical barrier to slow the diffusion of water or oxygen into the bitumen, slowing oxidative aging, and enhancing durability. With sulfur dissolved in the bitumen mixture, the sulfur bloom may replenish itself following surface damage by erosion or abrasion.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes sulfur-modified bitumen compositions, including compositions prepared by combining elemental sulfur and petroleum bitumen. The sulfur-modified bitumen compositions are suitable for use in waterproof sealants and binders, for example, to glue together stone aggregate in composites such as asphalt pavement and roof shingles. Elemental sulfur can crystallize on the surface of the bitumen, thereby acting as a shield to protect the bitumen from the environment. As used herein, sulfur "bloom" generally refers to a layer of elemental sulfur in crystalline form on a surface (e.g., on a bitumen or asphalt surface). Interaction of sulfur with bio-oil can be used to prevent sulfur crystallization in the bulk and facilitate the gradual bloom of sulfur on the surface, thereby promoting a regeneration process. If the bloom is damaged due, for example, to abrasion, another layer of sulfur bloom can be formed on the surface. The sulfur bloom can protect underlying layers from damage related to UV radiation. In addition, the hydrophobic nature of the bloom can help shield the surface against moisture damage. In some cases, the sulfur bloom can keep the surface free from contaminants while oxidizing and neutralizing free radicals generated on the surface.

One implementation of a sulfur-modified bitumen composition includes about 5 wt % to about 15 wt % (e.g., about 10 wt %) elemental sulfur. In this composition, a sulfur bloom is apparent as patches of microscale crystallites on a top surface of the bitumen. The bloom can take anywhere from a few days to several weeks to appear depending on mixture composition, method of sample preparation, thermal history, and other parameters. Sulfur-modified bitumen mixtures subjected to simulated oxidative aging in a pressure aging vessel (PAV) showed faster and more extensive blooming. The bloom appears to follow a nucleation and growth process. The length of time for the bloom to appear on some samples suggests a large activation energy to nucleation or a lack of heterogeneous nucleation sites at the bitumen surface. It is believed that the bloom results from separation and recrystallization of dissolved sulfur and is limited by sulfur diffusion and crystallite nucleation, both activated processes.

One beneficial application of controlled sulfur bloom is in creating a barrier layer to prevent evaporation of harmful volatile organic compounds (VOC) from freshly laid bitumen composites or coatings. Emission of VOC from asphalt, particularly intermediate or semivolatile organic compounds (I/SVOC) that release slowly over a longer period of time, can be harmful to public health both directly and as precursors to ozone and secondary organic aerosols (SOA). The loss of these compounds through evaporation or oxidation may also be a factor in embrittlement and reduced service life of bitumen materials, which would be another motivation for limiting their evaporation. Sulfur crystals at the bitumen surface could serve as a physical barrier to diffusion and evaporation of VOC, thereby simultaneously reducing the environmental impact and improving the durability of bitumen materials.

Sulfur can be dissolved in the bitumen mixture; the sulfur will bloom spontaneously at the exposed surface. One advantage of a sulfur bloom is that the sulfur can replenish itself if the surface is damaged or abraded. The presence of a reservoir of amorphous sulfur in the bulk bitumen mixture can promote passive self-regeneration or self-repair.

In addition to blocking evaporation of VOC, the sulfur crystals can also block absorption of molecules such as oxygen or water that would otherwise contribute to bitumen degradation. Sulfur crystallization concentrated at the surface may create an effective diffusion barrier without contributing to stiffening of the bitumen mixture.

Crystalline sulfur is a visible-light-active photocatalyst. Upon illumination at wavelengths below 400 nm, α-sulfur (the most stable allotrope at standard temperature and pressure) generates hydroxyl radicals from water. Little to no degradation of the crystalline sulfur is observed during this process. Thus, a top layer of crystalline sulfur may reduce VOC emission from bitumen and asphalt by generating free radicals upon exposure to sunlight. These radicals may oxidize or decompose the VOC before it has a chance to evaporate. Another potential advantage of this photocatalytic property is that it can make the surface anti-fouling, since free radicals are damaging to microorganisms. Since sulfur is abundant and inexpensive, its utilization allows conversion of a waste stream into value-added products.

While the presence of a sulfur bloom might accelerate oxidation of the bitumen surface through free radical generation, an extremely oxidized top layer can also form a protective "crust" over the bitumen, thereby slowing further degradation of the material underneath. An oxidized top layer on bitumen may contribute to the diffusion-blocking mechanism of the sulfur bloom, preventing the absorption of water or oxygen into the bulk or blocking small hydrocarbons from diffusing up from the bulk and escaping as VOC.

A top layer of sulfur may help to absorb or scatter sunlight, thereby protecting the underlying material from some solar radiation damage and offsetting potential oxidation caused by the free-radical mechanism. Reducing the absorption of solar radiation by bitumen materials may improve their durability by reducing photo-oxidation reactions, and may also reduce the VOC emissions that would otherwise occur at higher temperatures.

Another benefit of the sulfur bloom is that it can act as a naturally self-repairing superhydrophobic surface. Crystalline sulfur is somewhat hydrophobic, and the roughness of the polycrystalline sulfur bloom enhances this hydrophobic character. Assessment of water contact angle on a bitumen surface with sulfur bloom confirm this property. In sulfur-modified bitumen, if sulfur crystallization is initiated at exposed surfaces and hindered in the bulk material, the bloom structure could naturally replenish itself if abraded away.

This disclosure describes elemental sulfur separating out of sulfur-modified bitumen and crystallizing at the surface as sulfur "blooms." Bloom morphology and hydrophobicity, changes with oxidative aging, and possible interactions with rejuvenating agents derived from waste biomass are described. Computational modeling and laboratory experiments were used to examine sulfur's surface morphology, wetting characteristics, rheology, and molecular interactions with water and hydrocarbons. Crystallization of sulfur at the bitumen-air interface follows a nucleation and growth mechanism that could be self-regenerating if growth is slow and enough dissolved sulfur remains in the bulk bitumen.

The hydrophobicity of sulfur crystals was verified by DFT-based molecular modeling. Interactions of water molecules and elemental sulfur ($S_8$ ring) did not lead to stabilized $S_8$—$H_2O$ compounds, and water molecules moved away from the $S_8$ ring. The lack of effective interaction was attributed to the weaker H-bonding interactions between $S_8$ and $H_2O$ molecules compared to H-bonding interactions among $H_2O$ molecules. Strong H-bonding interactions lead to clustering of $H_2O$ molecules and move them away from the $S_8$ ring and subsequently from the surface of sulfur crystals. This was supported by contact angle measurements wherein the bloom showed hydrophobic character enhanced by surface roughness.

DFT results also showed that some typical molecules of bitumen or bitumen additives can hinder sulfur crystallization in the bulk phase and subsequently provide an opportunity for sulfur to bloom at the surface. While the results do not show significant interactions between $S_8$ molecules and polar molecules such as acetaldehyde, they show a good interaction between $S_8$ and polyaromatic molecules. An increasing trend was observed for interaction energies when the size of the aromatic core was increased, implying that polyaromatics with extended aromatic zones could reduce crystallization of sulfur rings in the bulk of bitumen.

Sulfur blooms are hydrophobic and photocatalytic, which may render result in a self-cleaning surface via both water-beading action and photooxidation of surface contaminants. The use of sulfur-modified bitumen in outdoor construction elements (e.g., roofing and roadways) therefore allows conversion of an abundant waste stream into a value-added product, while imparting self-cleaning characteristics to these bituminous composites.

Morphological Characterization and Control of Sulfur Bloom

A standard Superpave PG64-22 bitumen will be mixed with 10 wt % elemental sulfur. Testing of different concentrations of sulfur will be done to find the solubility limit of sulfur in bitumen and the impact of concentration on bloom kinetics and morphology. Scanning electron microscopy (SEM), AFM, and optical microscopy will be used to characterize the area of sulfur bloom and crystallite size and shape. Crystal size and shape is believed to be dependent on the speed of bloom formation (itself dependent on sulfur concentration and temperature) and any compounds in the mixture that may bind to the crystal surface. Smaller crystals may be more photoactive due to higher surface area-to-volume, while crystals with higher aspect ratio would increase the roughness of the bloom and benefit the superhydrophobic character. To be an effective light-scattering coating, particle sizes can be polydisperse and roughly span the visible and infrared wavelength range (350-2000 nm) that includes the majority of incident solar energy.

Preliminary observations have shown that sulfur crystallization can be erratic and may occur through a nucleation and growth mechanism, which would suggest that it is kinetically hindered by some activation energy. Controlling sulfur crystallization is desirable not only for reproducible measurement, but also to effectively take advantage of any beneficial effects. Crystallization can be initiated at the surface and hindered in the bulk. The bloom can be initiated by seeding the surface with sulfur particles. After the initial seeding, the bloom can regenerate from surface damage through self-seeding. Other mineral particles such as silica, calcium carbonate, and clay can be employed for their ability to nucleate sulfur crystallization. Temperature is also a relevant parameter to vary and control, since both crystallization and diffusion are activated processes. Temperatures within the typical range experienced by outdoor construction elements during summer months (up to about 60° C.) are particularly relevant. Moderately elevated temperatures can accelerate diffusion and promote blooming. Very high temperatures can hinder blooming by increasing sulfur's solubility in bitumen.

Differential scanning calorimetry (DSC) can be used to assess the sulfur phase transition in a more quantitative manner. Standard DSC thermal scans can be used to quantify the amount of crystalline sulfur in the mixture. Rate constants of the crystallization process can be calculated through isothermal crystallization experiments and fitting to Equation 1 (the Sestak-Berggren equation):

$$\frac{d\alpha}{dt} = k(T)\alpha^m(1-\alpha)^n \qquad (1)$$

where $\alpha$ is the conversion level, k(T) is the rate constant, and m and n are reaction order constants. A higher activation energy to crystallization may be advantageous, since crystallization of sulfur at the surface but not in the bulk is desired. A sulfur bloom at the surface may not be able to replenish itself after being damaged if all of the sulfur in the mixture has already crystallized within the bulk, and specific bitumen compounds or additives that prevent such crystallization can be beneficial. Sustainable, bio-derived modifiers for rejuvenating and improving the durability of bitumen may be help to prevent such crystallization.

The addition of sulfur initially reduces the stiffness of bitumen. This stiffness can recover over time but to different degrees, depending on the composition of the bitumen and the bio-oils added to the mixture. In one example, sulfur-modified bitumen with waste vegetable oil (WVO) shows almost complete rheological recovery after 60 days, but mixtures with bio-oils derived from cellulosic plant biomass including wood pellet (WP), corn stover, and miscanthus show persistent softening and increased phase angle (greater viscous versus elastic behavior) as measured by dynamic shear rheometry (DSR). One possible explanation for the recovery in stiffness is sulfur crystallizing in the bulk and acting as solid filler particles. Conversely, certain compounds in cellulosic bio-oils may hinder sulfur crystallization or promote sulfur solubility. Cellulosic bio-oils are comparatively low in saturated alkanes and high in compounds with oxygen groups.

Characterization of Physical Properties and Performance of Sulfur Blooms by Contact Angle, Nanoindentation, Surface Temperature, and Light-Scattering Measurements Nanoindentation experiments can measure the thickness and mechanical properties (such as modulus, hardness, and brittleness) of the sulfur bloom, including any oxidized layer. The solid sulfur crystals at the surface together with a polar, highly oxidized crust can form an effective barrier layer to block diffusion of potential VOC from reaching the surface. This is an additional VOC control mechanism together with any photocatalytic activity of the sulfur bloom itself. The mechanical properties of this crust can influence its durability and resistance to abrasion.

Nanoindentation can be performed using both an AFM and a dedicated nanoindenter to measure the mechanical properties of the surface of UV-treated bitumen thin films. In one example, a 100-fold increase in modulus was found after only 20 h UV exposure. In that case, indentation depths were limited to 50 nm (no more than $1/10^{th}$ the thickness of the film) to avoid interference from the underlying glass substrate. The UV-treated thin films were inhomogeneous with depth and exhibited an extra-hardened skin layer, which meant that measured values of the indentation modulus could not be regarded as fully quantitative. However, even qualitative measures can provide insight into the mechanical behavior of the sulfur-bloom film. A relative increase in hardness can indicate a thicker, denser, or more fully oxidized crust layer. Deeper indentations can be made to puncture through the surface sulfur film to obtain a measure of its thickness. To investigate whether sulfur bloom provides any protective effect against further oxidation, samples can be exposed to simulated solar irradiation, and the measured thickness of the hardened skin layer can be used as a figure of merit. If the skin layer offers little or no protective effect, its thickness may grow monotonically with the duration of irradiation. If there is a protective effect, the thickness may level off quickly.

The wetting characteristics of the sulfur bloom can be measured by water contact-angle measurements. These measurements can include static, advancing, and receding contact angles. Surface roughness can enhance existing hydrophobicity or hydrophilicity. Preliminary experiments suggest that a sulfur bloom can enhance hydrophobicity. However, water droplets on a sulfur bloom may exhibit contact-angle hysteresis and contact-line pinning. Wetting of bitumen is time-dependent, and extended water exposure can alter the chemistry and morphology of the bitumen surface, making it more hydrophilic. In some cases, this change may lead to trapping of water between the crystals of the sulfur bloom. Bitumen composition may also impact wetting behavior and may need to be adjusted accordingly. For example, added paraffin wax may separate out at the surface together with the sulfur and increase hydrophobicity.

A sulfur bloom may further protect the underlying bitumen through scattering of solar radiation that would otherwise be absorbed and converted to heat. Light-scattering properties of the surface can be measured by spectroscopy using a diffuse-reflectance integrating sphere.

Element Mapping and Chemical Characterization of Sulfur and Photooxidation Products To assess the photocatalytic properties of crystallized sulfur on bitumen, samples with bloom can be exposed to simulated solar irradiation and tested for VOC emission. Intermediate-size hydrocarbons (including alkanes and polyaromatics) are believed to make up the majority of I/SVOC emissions. Emissions increased with increased temperature and simulated solar irradiation. Oxygenated VOC was less than 10% of total emissions, although polar compounds are typically less volatile than nonpolar hydrocarbons. If the sulfur crystals are photocatalytic, a drop in hydrocarbon VOC is expected, which include harmful aromatic derivatives like benzene and toluene.

After exposure, FTIR is used for chemical characterization of any non-volatile oxidation products of bitumen or sulfur. Energy-dispersive x-ray spectroscopy (EDX) is also useful for element mapping of sulfur and oxygen. The sampling depths of ATR-FTIR and EDX are similar at around 1-3 μm, which may be sufficient to distinguish the oxidized surface layer and sulfur bloom from the bulk material underneath. EDX has been used to map the distribution of sulfur, carbon, and oxygen in UV-treated neat and bio-modified bitumen thin films. For sulfur-modified bitumen, mapping the distribution of oxygen at the surface around sulfur crystals can give an indication of the photocatalytic activity of sulfur (if oxygen is co-localized around the sulfur) as well as the extent of diffusion of free radicals or oxidation products outwards. This examination can be done on samples in the early stage of blooming, where surface coverage is still sparse. Mapping of elemental sulfur can yield information on the mechanism of bloom formation or possible degradation of the sulfur crystals. In neat bitumen mixtures, growth of sulfur crystals at the surface can lead to localized depletion of sulfur around the growing crystal, particularly if diffusion is a limiting factor. However, if the sulfur crystal itself starts to degrade under simulated environmental exposure (sunlight or water) then sulfur or sulfoxide compounds could start to "bleed" outwards from the crystal.

If fracture cross-sections of the samples can be obtained, then EDX analysis can be used to map element distribution through the depth of the surface layer. This would allow corroboration of nanoindentation measurements of the surface-layer thickness and provide more insight into the chemical composition and microstructure of the bitumen just beneath the surface layer. Diffusion of oxidation products from the surface deeper into the bulk is a mechanism implicated in UV-induced aging of bitumen, so this analysis would not only be useful for developing sulfur-modified bitumen mixtures but also for general efforts toward mitigating age-related hardening and increasing the service life of bitumen materials.

Computational Modeling of Chemical Interactions and Diffusion in Sulfur-Modified Bitumen α-sulfur (the most stable allotrope at STP) is known to catalyze the generation of hydroxyl radicals via the oxidation of hydroxyl ions in water under visible-light (<400 nm) illumination, although the efficiency of the process can be low due at least in part to the hydrophobic nature of the sulfur surface. DFT calculations confirm the poor interaction between water and sulfur, but also suggest a more facile reaction with oxygen. This suggests the possibility of radical generation (or degradation) under dry conditions. DFT modeling can be used to assess the reactivity or charge-transfer characteristics of different sulfur crystal facets as well as their physical interaction with various bitumen or bio-oil compounds. Passivation of the growing sulfur crystal surface could affect its final size, morphology, and photocatalytic efficacy. These calculations will support and inform concurrent activities aimed at controlling sulfur crystallization and morphology for optimized photocatalytic activity and VOC control.

Another target for DFT calculations is modeling intermolecular interactions between dissolved sulfur rings ($S_8$) and specific bitumen or bio-oil molecules. Preliminary results suggest that some bio-oil formulations may be able to hinder sulfur crystallization in the bulk phase. Using DFT to identify the molecules that bind most strongly to $S_8$ would aid in optimizing bio-oil formulations to hinder crystallization more effectively. Cellulosic bio-oils tend to have higher concentrations of oxygen-containing chemical groups, particularly hydroxyls and carbonyls (carboxylic acids, esters, ketones, and aldehydes). Initial calculations show a negligible interaction between $S_8$ and acetaldehyde. Cellulosic bio-oils tend to have a negative impact on the resistance of the mixture to moisture damage, at least in part due to the presence of acid compounds. However, at least some of the detrimental effect of acid compounds can be mitigated by binding to mineral fillers. If there is a strong interaction between $S_8$ and carboxylic acids, then the impact on moisture susceptibility could be alleviated, thereby improving the commercial viability of inexpensive bio-oils derived from agricultural and renewable plant waste.

Strong interactions between $S_8$ and certain bitumen fractions (asphaltenes, resins, aromatics, or saturates) could also be indicative of composition-dependent sulfur solubility in the bitumen mixture. Being able to estimate sulfur solubility based on bitumen composition and thereby account for batch-to-batch variations could be useful for commercial production of bitumen. These calculations help clarify the fundamental mechanisms by which sulfur impacts the rheological properties of bitumen, in addition to sulfur's catalytic activity and phase-separation behavior. Preliminary DFT calculations show that binding energies between $S_8$ and selected small polyaromatics are in the range of −10 to −15 kcal/mol. These energies are smaller than calculated binding energies for asphaltene dimers (−31 kcal/mol) or for asphaltene-hexadecanamide bio-oil complexes (−28 kcal/mol), although at least one relevant factor is the higher molecular weight of asphaltenes compared to small polyaromatics.

Diffusion properties can play a role in sulfur crystallization and VOC emission. Molecular dynamics (MD) methods can be used to model sulfur diffusion and phase separation in both neat and oxidized bitumen. These calculations will be helpful for understanding how sulfur might crystallize in the bulk or diffuse to the surface and bloom. Parameters that hinder the former and enable the latter can be identified. MD calculations can also be used to model diffusion of light bitumen compounds through highly oxidized bitumen. Nonpolar VOC may be effectively blocked from diffusing to the air surface by a polar oxidized crust. Minimum thickness and maximum porosity suitable for effective barrier properties can be assessed.

EXAMPLES

Example 1

Bitumen (PG 64-22) was provided by Holy Frontier Company in Phoenix, Arizona (Table 1). The bitumen was a polyphosphoric acid modified bitumen and contained 15% bio-treated crumb rubber (<0.25 mm). Crumb rubber particles were treated using bio-oils made from corn stover, castor oil, miscanthus, wood pellet, or waste vegetable oil to make rubberized asphalt. Sulfur was acquired through Sigma Aldrich and added to each rubberized asphalt at 10% by weight. Blending of sulfur and rubberized asphalt was performed at 135° C. for 30 min.

TABLE 1

General properties of the PG 64-22 bitumen

| Properties | Values |
| --- | --- |
| Specific gravity @15.6° C. | 1.041 |
| Cleveland open cup method flash point | 335° C. |
| Mass change after rolling thin-film oven test | −0.013% |
| Absolute viscosity @ 60° C. | 179 Pa · s |
| Stiffness @−12° C., 60 s | 71.67 MPa |

An Anton Paar Modular Compact Rheometer MCR 302 was used to measure the elastic and viscous properties of each sample following the ASTMD7175. The test was conducted at 0.1% strain rate at frequency ranging from 0.1 to 100 rad/s using an 8-mm parallel plate. The test was performed at 52° C. From the measured data, the complex shear modulus (G*) and phase angle (154 δ) were calculated using Equation (2)

$$G^* = \frac{\tau_{max}}{\gamma_{max}}, \quad \tau_{max} = \frac{2T}{\pi r^3}, \quad \gamma_{max} = \left(\frac{\theta r}{h}\right) \quad (2)$$

where $\gamma_{max}$ is maximum strain, $\Sigma_{max}$, is maximum stress, T is maximum applied torque, r is radius of the sample, θ is deflection (rotational) angle, and h is height of the sample. The values of the complex modulus and phase angle were then used to calculate G*sin δ and G*/sin δ. The results were compared before and after sulfur was introduced to the samples.

Thin-layer Chromatography with Flame Ionization Detection (TLC-FID) The fractional composition of each bio-oil was investigated using an Iatroscan MK-6s model TLC Flame Ionization Detector (FID). The hydrogen flow rate and airflow rate were established at 160 mL/min and 2 L/min, respectively. The n-heptane-insoluble part, specially the asphaltene content, was isolated and evaluated using the difference in mass of the filter paper just before and subsequently after the filtration following standards (ASTM-D3279, 2019). Then, 20 mg of n-heptane soluble (maltene) was detected on the chromrods. To develop the solvent, Sigma Aldrich supplied solutions of pentane, toluene, and chloroform were used. In a pentane tank, the chromrods were developed for 35-40 min and dried in the air for about 2 to 5 min. The dried chromrods were then moved to a second chamber filled with toluene to chloroform solution ratio at 9:1 for 9 min. Finally, the rods were oven dried at 85° C., and the prepared specimen was scanned for 30 s using the Flame Ionization Detector.

Gas Chromatography-Mass Spectroscopy The wood pellet bio-oil was analyzed using a gas chromatography mass spectrometer (GC-MS) for chemical and molecular composition. The bio-oil was dissolved in dichloromethane (DCM) and was filtered through a 0.2 μm PTFE filter prior to injection into the GC column. A DB-5 column (30 m×250 μm×0.25 μm) was used to separate molecules based on molecular weight. The carrier gas (helium) was maintained at 1 mL/min throughout the analysis. The samples were diluted 10-fold before 1 μL was injected into the column in split-less mode. The inlet temperature was maintained at 280° C., the transfer line temperature was 250° C., and source temperature was 230° C. The chromatogram and the major peaks were processed and integrated using ChemStation and matched to the NIST17 database.

Experiments The stiffness of bio-modified rubberized asphalt was reduced upon the introduction of sulfur. The percent of reduction in G*sin δ and G*/sin δ varied depending on the composition of the bio-oils used. Wood-based bio-oil had the highest reduction and waste vegetable oil had the lowest reduction. TLC-FID and Gas Chromatography-Mass Spectroscopy analysis showed wood based bio-oil has a high resin content as well as more than 41.8% phenolic compounds out of a total of 66% recognized by GC-MS while waste vegetable oil had low resin content and almost no phenolic structures.

Example 2

A standard Superpave PG64-22 bitumen was mixed with 10 wt % elemental sulfur. The stiffness of bitumen was assessed using the bending beam rheometer test, as outlined in the standard ASTM-D6648 test. Rubberized bitumen was chosen for this study because it is commonly used in states with high solar radiation. Sulfur was acquired from Sigma Aldrich and added to each rubberized bitumen at 10% by weight. Blending of sulfur and rubberized bitumen was performed at 135° C. for 30 min.

TABLE 2

General properties of the PG 64-22 bitumen

| Properties | Values | Testing methods |
| --- | --- | --- |
| Specific gravity @15.6° C. | 1.041 | ASTM D70 |
| Penetration @25° C. | 70 0.1 mm | ASTM D5 |
| Softening point | 46.0° C. | ASTM D36 |
| Ductility @ 15° C. | >100 cm | ASTM D113 |
| Cleveland open cup method flash point | 335° C. | ASTM D92 |
| Mass change after rolling thin-film oven test | −0.013% | ASTM D6 |
| Absolute viscosity @ 60° C. | 179 Pa · s | ASTM D2171 |
| Stiffness @-12° C., 60 s | 85.8 MPa | ASTM D6648 |

Bio-oils were derived from waste biomass such as wood pellets (WP) by a hydrothermal liquefaction process. Waste vegetable oil (WVO) was obtained from Mahoney Environmental Inc., Phoenix, AZ, a processing facility for waste cooking oil; it was also tested elsewhere as a bitumen modifier. Based on the GC/MS area of the individual compounds detected by mass spectrometry, the dominant molecules of WVO used are shown in Table 3. Bitumen containing sulfur was mixed with 10 wt % bio-oil in a single blending step where applicable.

TABLE 3

The dominant components of waste vegetable oil used

| | Waste Vegetable Oil | Formula | Area % |
| --- | --- | --- | --- |
| 1 | cis-Vaccenic acid | C18H34O2 | 44 |
| 2 | Dihomolinoleic acid | C18H32O2 | 14 |
| 3 | Octadecanoic acid | C18H36O2 | 12 |
| 4 | Glyceryl monooleate | C21H40O4 | 5 |
| 5 | 2-Undecen-1-ol, (E)- | C11H22O | 3 |
| 6 | 2-Linoleoylglycerol | C21H38O4 | 2 |
| 7 | Palmitic acid vinyl ester | C18H34O2 | 2 |
| 8 | Glycidyl oleate | C21H38O3 | 2 |
| 9 | 10-Undecynoic acid | C11H18O2 | 2 |
| 10 | Glycidyl palmitate | C19H36O3 | 1 |
| | | | 87% |

DFT-based quantum mechanical calculations A quantum-based approach, dispersion-corrected density functional theory (DFT), was used to calculate the target interactions. The DFT calculations were performed using the numerical atomic-orbital based DMol$^3$ module implemented in the Accelrys Materials Studio program package. A generalized gradient approximation (GGA)-type functional, the Perdew-Burke-Ernzerhof (PBE) functional, was used for the calculations. To include the long-range dispersion corrections, Grimme's correction was used. The double-numerical basis with a polarization function, DNP, was used for the all-electron optimizations with no constraint on the molecular structures. The tolerance levels for energy, maximum force, and displacement convergence were $11.0 \times 10^{-5}$ hartree, $2.0 \times 10^{-3}$ hartree Å$^{-1}$, and $5.0 \times 10^{-3}$ Å, respectively. The interaction energy between two target constituents, A and B, is calculated as the energy difference (ΔE) between the compound formed, AB, and its components A and B, when they are in their lowest energy states; see Equation 3.

$$\Delta E = E_{AB} - (E_A + E_B) \tag{3}$$

In Equation 3, $E_{AB}$ is the energy of the newly formed compound (AB), and $E_A$ and $E_B$ respectively refer to the optimized energies of the initial constituents A and B.

Microscopy and rheometry Atomic force microscopy (AFM) was performed using a demonstration model NanoIR3 system (Bruker Nano/Anasys Instruments) operating in tapping mode. The probes used for the experiments were soft tapping mode AFM probes (PR-EX-TnIR-A, Bruker Nano/Anasys Instruments) with overall gold coating, nominal probe diameter ~20 nm, and nominal frequency 60 kHz. Optical microscope images were collected using an OMAX trinocular polarizing microscope.

An Anton Paar MCR 302 dynamic shear rheometer (DSR) was used to test the rheological properties of the bitumen with and without sulfur modification. A frequency sweep at 52° C. with angular frequencies ranging from 0.1 rad/s to 100 rad/s using a parallel plate (8-mm diameter) with 2-mm gap was used to measure the complex modulus (G*) of each specimen.

Binder aging and contact angle measurement The neat binder was aged in the laboratory by a standard method, combining aging in a rolling thin-film oven (RTFO, as per ASTM D2872) and a pressure aging vessel (PAV, as per ASTM D6521). RTFO aging was performed by placing asphalt binder samples in glass bottles in a rotating carriage in an oven at 163° C. and 4 L/min airflow for 85 minutes to simulate conditions at an asphalt-mixing plant. The sample was then exposed to PAV aging in which portions of approximately 50 g each were subjected to a pressure of 2.10 MPa at 100° C. for 40 h (this is referred to as "2PAV" because a single standard cycle is 20 h). Samples were then degassed in a vacuum oven at 170° C. for 30 minutes. Simple preliminary contact angle measurements were performed by taking pictures of a 3 μL water droplet on the sample surface with a digital camera and manually measuring the angle in ImageJ image processing software.

Photographs and microscope images of sulfur bloom on the surface of sulfur-modified bitumen were recorded. This phenomenon was unexpected, since solid sulfur is denser than bitumen. Each bloom patch appeared to nucleate from a single point and grow outwards up to several millimeters in diameter. AFM shows that the bloom was composed of microscale crystallites. The bloom can take anywhere from a few days to several weeks to appear, depending on mixture composition, method of sample preparation, thermal history, and other experiment factors. Images were taken roughly one month after the sample was prepared. Sulfur-modified bitumen mixtures subjected to simulated oxidative aging in a pressure aging vessel (PAV) showed faster and more extensive blooming, sometimes covering the entire surface of the sample.

The bloom appeared to follow a nucleation and growth process; the fact that it took weeks for the bloom to appear on some samples suggests a large activation energy to nucleation or a lack of heterogeneous nucleation sites at the bitumen surface. It is believed that the bloom results from separation and recrystallization of dissolved sulfur and is limited at least in part by sulfur diffusion and crystallite nucleation, both activated processes.

Although slow growth of the bloom makes it difficult to study, the development of strategies to further hinder bloom formation would be useful if the bloom is detrimental to material performance. If the bloom exhibits useful properties like superhydrophobicity, it would still be useful to prevent sulfur crystallization in the bulk rather than at the surface. Slower bloom growth would also delay the system from reaching equilibrium, extending the timeframe over which growth could occur and making it more likely that the bloom would be able to regenerate itself if damaged. Abrasion damage is a challenge for any type of functional coating, so the ability to self-regenerate would be an advantageous property of a beneficial bloom.

Figure 1A:
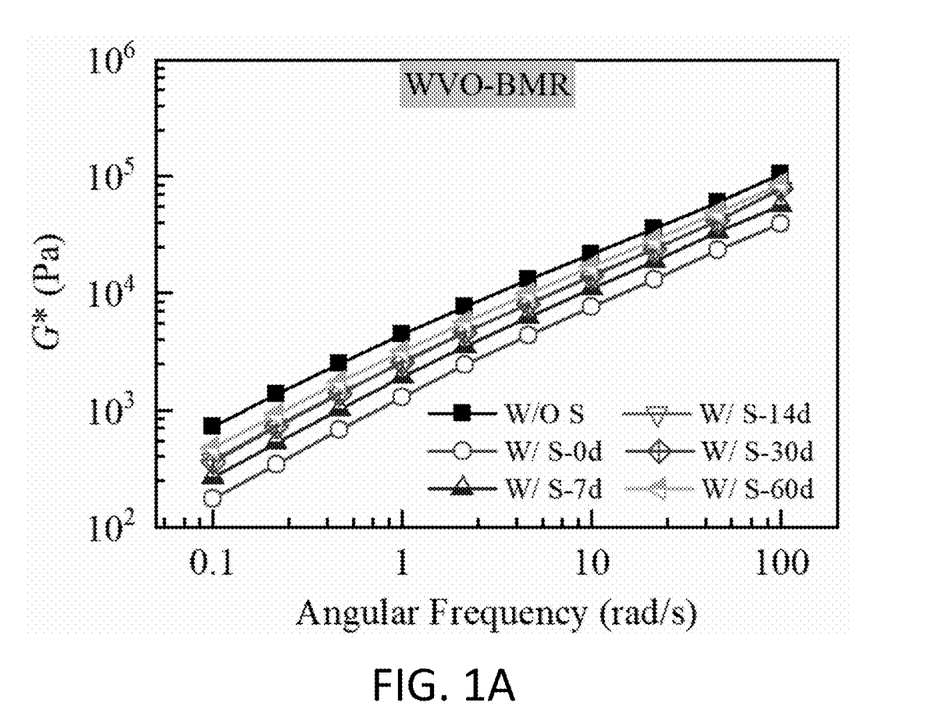
FIGS. 1A and 1B show the complex modulus at 52° C. of bitumen mixtures with either waste vegetable oil (WVO) or wood pellet bio-oil (WP), respectively, without sulfur (W/O S) or with sulfur (W/S), after up to 60 days curing at room temperature
Figure 1B:
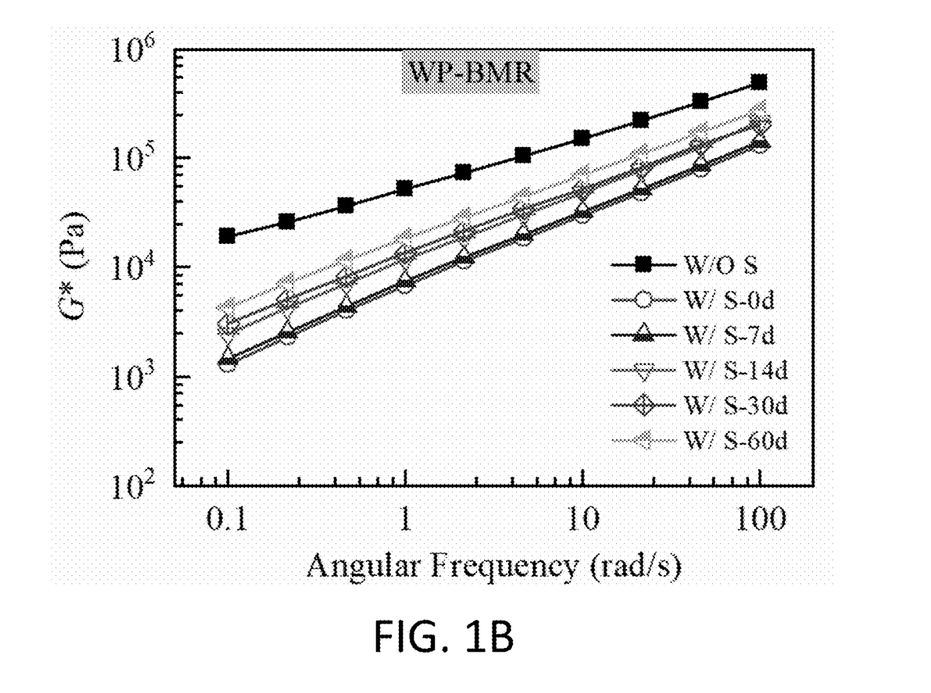

Rheometry Analysis Hindering sulfur crystallization in the bulk would be helpful regardless of whether the surface bloom is beneficial. For this purpose, preliminary measurements were taken of sulfur-modified bitumen mixed with different bio-oils derived from organic waste streams. FIGS. 1A and 1B show complex modulus at 52° C. of bitumen mixtures with either waste vegetable oil (WVO) or wood pellet bio-oil (WP), respectively, without sulfur (W/O S) or with sulfur (W/S), after up to 60 days curing at room temperature. Dynamic shear rheometer (DSR) results in FIGS. 1A and 1B show that the addition of sulfur reduces the stiffness of bitumen even further than the addition of either waste vegetable oil (WVO) or wood pellet bio-oil (WP) alone. Initially, WVO alone softened the bitumen more than WP alone, but the softening effect of sulfur was greater in the WP mixture. After 60 days at room temperature, sulfur-modified samples show some recovery of stiffness, but only the WVO-sulfur-bitumen mixture shows recovery of modulus approaching that of the non-sulfur sample. Mixtures with WP or bio-oils derived from other cellulosic plant show persistent softening. A possible explanation for the loss of softening over time in sulfur-doped bitumen is sulfur crystallizing in the bitumen bulk and acting as solid filler particles. Certain compounds in cellulosic bio-oils (such as those in WP) can hinder sulfur crystallization and promote sulfur solubility. The latter can be attributed to cellulosic bio-oils that are low in saturated alkanes and high in oxygenated groups.

Contact Angle Measurement Crystalline sulfur is somewhat hydrophobic, and the roughness of the polycrystalline sulfur bloom may enhance this hydrophobic character. A preliminary test of water contact angle on a bitumen surface with sulfur bloom seems to confirm this idea. The initial water contact angle measured on 2PAV-aged sulfur-modified bitumen fully covered with bloom was 105° compared to 90° on 2PAV-aged bitumen without sulfur and 80° on neat bitumen. The contact angle of sulfur bloom on a non-aged sample could not be measured because no samples developed a large enough area of contiguous bloom on which a droplet could be placed, whereas the 2PAV-aged sample became entirely covered in sulfur bloom within a matter of days. This enhanced hydrophobicity could be useful in improving the water resistance and repellency of bitumen-based construction composites.

Regarding the aged sample without sulfur, while oxidative aging increases the average polarity of the material and might normally lead to an expected decrease in water contact angle, oxidation of asphaltenes and resins in bitumen can lead to enhanced phase separation of saturate wax that can float to the surface and increase the contact angle. However, water contact angles on bitumen tend to decrease over time if the droplet is allowed to dwell on the surface, due to surface reconstruction and chemical diffusion at the water-bitumen interface. This is especially true for a rough surface like the sulfur bloom, since water can gradually fill in crevices in the surface, leading to contact line pinning or even a transition from a hydrophobic character to hydrophilic.

DFT-based Modeling Analysis Under visible light illumination (<400 nm), α-sulfur catalyzes the generation of hydroxyl radicals via oxidation of hydroxyl ions in water molecules. However, in this process, the photocatalytic activity of the sulfur crystals in splitting the water molecules is low, in part due to the hydrophobic nature of the sulfur surface. To get further insight into the interaction of elemental sulfur with $H_2O$ molecules, quantum mechanical calculations were performed in the framework of density functional theory (DFT). No stable structure was achieved through the interaction of water molecules and $S_8$ units, as indicated by the positive energy (E=+30.5 kcal/mol) for the interaction of four $H_2O$ molecules and one $S_8$ unit.

The probable non-bonding interactions, including dipole-dipole or H-bonding, between an $S_8$ unit and one $H_2O$ molecule, were investigated. Different orientations of a water molecule toward $S_8$ form the $H_2O$—$S_8$ compounds that are energetically stabilized in the range of (−5.3 to −8.1) kcal/mol. These interactions have low energy values, but also a larger scale and greater number of interacting constituents ($S_8$ and $H_2O$). The destabilized compound resulting from interaction of an $S_8$ molecule and four $H_2O$ molecules suggests increasing number of water molecules does not lead to a more stabilized compound: the $H_2O$ molecules are repelled by the $S_8$ unit. The hydrophobicity of $S_8$ molecules could be understood based on the weak interactions between S atoms and $H_2O$ molecules and the strong interactions among $H_2O$ molecules. $S_8$ is a stable molecule that is not easily affected by the $H_2O$ molecules: the S—S bonds are not cleaved or weakened. Considering the lower electronegativity of S atoms compared to 0 atoms, H-bonding interactions between an $S_8$ molecule and $H_2O$ (S . . . H—O—H) are not as strong as H-bonding among $H_2O$ molecules (O . . . H—O—H). So, clustering of water molecules due to attraction forces resulting from H-bonding interactions takes them away from the $S_8$ molecular units and subsequently from the crystal surface.

Some molecules in neat bitumen or bituminous additives may able to hinder sulfur crystallization in the bulk phase. Using DFT to identify the molecules that bind most strongly to $S_8$ can help optimize bio-oil formulations to hinder crystallization in the bulk. The bio-oils usually added to bitumen have high concentrations of oxygen-containing chemical groups, particularly hydroxyls and carbonyls (carboxylic acids, esters, ketones, and aldehydes). DFT results do not show a significant interaction between $S_8$ and acetaldehyde (a representative molecule for the O-containing functional groups), as indicated by $E_{int}$=−(2.2–6.0) kcal/ mol. In practice, sulfur is not soluble in polar solvents, confirming the low tendency of sulfur to interact with polar functional groups.

The interactions between $S_8$ and certain fractions of bitumen such as asphaltenes or resins suggest composition-dependent sulfur solubility in the bitumen mixture. These calculations also help clarify the fundamental mechanisms by which sulfur impacts the rheological properties of bitumen, in addition to sulfur's catalytic activity and phase-separation behavior. DFT calculations show a range of binding energies between $S_8$ and some selected small polyaromatic model molecules. The role of the aromatic zone and its size is reflected in the values of binding energies that increase from naphthalene with two benzene rings to pyrene with four benzene rings. The increasing trend of energy with increasing size of the aromatic core predicts a good non-bonding interaction between asphaltene planes (containing of multiple aromatic rings) and dissolved sulfur $S_8$. The considerable interaction between polyaromatic species and $S_8$ rings (naphthalene-$S_8$: $E_{int}$=−10.5 kcal/mol, anthracene-$S_8$: $E_{int}$=−14.3 kcal/mol, pyrene-$S_8$: $E_{int}$=−15.6 kcal/mol) may be a deterrent to sulfur crystallization in the bulk phase, as less crystallization in bulk is accompanied by more crystallization (sulfur bloom) on the surface.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of preparing a modified bitumen, the method comprising:
    combining bitumen with elemental sulfur to yield a mixture, wherein the mixture comprises about 5 wt % to about 15 wt % of the elemental sulfur; and
    crystallizing the elemental sulfur on a surface of the bitumen to yield a layer of elemental sulfur on the surface of the bitumen to yield the modified bitumen,
    wherein crystallizing the elemental sulfur on a surface of the bitumen comprises heating the bitumen under pressure in a pressure aging vessel.

2. The method of claim 1, wherein the mixture comprises about 10 wt % of the elemental sulfur.

3. The method of claim 1, further comprising combining a bio-oil with the mixture.

4. The method of claim 3, wherein the bio-oil comprises one or more of waste vegetable oil, wood pellet oil, corn stover oil, and miscanthus oil.

5. The method of claim 3, wherein the bio-oil comprises polyaromatic molecules.

6. The method of claim 1, wherein the rubberized bitumen comprises crumb rubber.

7. The method of claim 6, wherein the crumb rubber comprises bio-treated crumb rubber.

8. The method of claim 7, wherein the bio-treated crumb rubber comprises corn stover oil, castor oil, miscanthus oil, wood pellet oil, or waste vegetable oil.

9. The method of claim 1, wherein the elemental sulfur on the surface of the bitumen comprises sulfur blooms.

10. The method of claim 9, wherein the sulfur blooms comprise regions of microscale elemental sulfur crystals.

11. The method of claim 10, wherein the regions comprise millimeter-sized patches.

12. The method of claim 1, wherein the modified bitumen comprises amorphous elemental sulfur.

13. The method of claim 12, wherein at least some of the amorphous elemental sulfur is beneath a surface of the modified bitumen.

14. The method of claim 1, wherein the mixture consists of bitumen and elemental sulfur.

15. The method of claim 1, wherein the mixture consists of bitumen, elemental sulfur, and bio-oil.

16. The method of claim 15, wherein the bio-oil comprises waste vegetable oil, wood pellet oil, corn stover oil, or miscanthus oil.

17. The method of claim 16, wherein the bio-oil comprises wood pellet bio-oil.

18. The method of claim 1, wherein the mixture is free of stone aggregate.

19. The method of claim 1, wherein the bitumen comprises rubberized bitumen.

* * * * *